(12) United States Patent
Kaneko

(10) Patent No.: US 11,519,781 B2
(45) Date of Patent: Dec. 6, 2022

(54) IMAGE PROCESSING DEVICE, IMAGE PROCESSING METHOD, AND RECORDING MEDIUM

(71) Applicant: NEC Corporation, Tokyo (JP)

(72) Inventor: Eiji Kaneko, Tokyo (JP)

(73) Assignee: NEC CORPORATION, Tokyo (JP)

( * ) Notice: Subject to any disclaimer, the term of this patent is extended or adjusted under 35 U.S.C. 154(b) by 935 days.

(21) Appl. No.: 16/318,029

(22) PCT Filed: Jul. 20, 2017

(86) PCT No.: PCT/JP2017/026195
§ 371 (c)(1),
(2) Date: Jan. 15, 2019

(87) PCT Pub. No.: WO2018/016555
PCT Pub. Date: Jan. 25, 2018

(65) Prior Publication Data
US 2021/0285815 A1    Sep. 16, 2021

(30) Foreign Application Priority Data

Jul. 22, 2016 (JP) .............................. JP2016-144486

(51) Int. Cl.
*G01J 1/42* (2006.01)
*G06T 7/11* (2017.01)
(Continued)

(52) U.S. Cl.
CPC ................. *G01J 1/42* (2013.01); *G01W 1/12* (2013.01); *G06T 7/11* (2017.01); *G06V 20/13* (2022.01);
(Continued)

(58) Field of Classification Search
CPC ..... G01J 1/42; G01J 2001/4266; G01W 1/12; G01W 1/08; G06T 7/11;
(Continued)

(56) References Cited

U.S. PATENT DOCUMENTS

| 2005/0212794 A1 | 9/2005 | Furukawa et al. |
| 2009/0074297 A1* | 3/2009 | Robinson ............... G06V 20/13 382/191 |
| 2015/0161768 A1* | 6/2015 | Ardouin .................. G06T 5/007 382/113 |

FOREIGN PATENT DOCUMENTS

| CA | 2012702 A1 * 10/1990 |
| CN | 103134490 A    6/2013 |

(Continued)

OTHER PUBLICATIONS

International Search Report dated Oct. 24, 2017, in corresponding PCT International Application.

(Continued)

*Primary Examiner* — Kiho Kim
(74) *Attorney, Agent, or Firm* — Sughrue Mion, PLLC

(57) ABSTRACT

An image processing device 100 includes a calculation unit 110 for calculating a solar radiation spectrum in a given area on the ground surface on the basis of an observed image of the area, a solar radiation spectrum component of the area, and the spectrum of a pure substance estimated in the area, and a conversion unit 120 for converting the observed image on the basis of the calculated solar radiation spectrum.

20 Claims, 5 Drawing Sheets

(51) Int. Cl.
*G01W 1/12* (2006.01)
*G06V 20/13* (2022.01)

(52) U.S. Cl.
CPC ............. *G01J 2001/4266* (2013.01); *G06T 2207/10024* (2013.01); *G06T 2207/10032* (2013.01); *G06T 2207/30192* (2013.01)

(58) Field of Classification Search
CPC . G06T 2207/10024; G06T 2207/10032; G06T 2207/30192; G06T 2207/30181; G06T 1/00; G06T 5/008; G06T 7/00; G06V 20/13
See application file for complete search history.

(56) References Cited

FOREIGN PATENT DOCUMENTS

| | | | |
|---|---|---|---|
| CN | 103363959 A | 10/2013 | |
| JP | S63-201875 A | 8/1988 | |
| JP | 2001-143054 A | 5/2001 | |
| JP | 2005-031927 A | 2/2005 | |
| JP | 2008-527766 A | 7/2008 | |
| WO | WO-2012063241 A1 * | 5/2012 | ............. G01N 21/31 |
| WO | WO 2012/086658 A1 | 6/2012 | |
| WO | WO 2013/099644 A1 | 7/2013 | |
| WO | WO 2016/103566 A1 | 6/2016 | |

OTHER PUBLICATIONS

Liu et al., "Object-Based Shadow Extraction and Correction of High-Resolution Optical Satellite Images", IEEE Journal of Selected Topics in Applied Earth Observations and Remote Sensing, vol. 5, No. 4, pp. 1296-1302, (2012).
Bird et al., "Simple Solar Spectral Model for Direct and Diffuse Irradiance on Horizontal and Tilted Planes at the Earth's Surface for Cloudless Atmospheres", Journal of Climate and Applied Meteorology. vol. 25(1), pp. 87-97, (1986).
Extended European Search Report iissued by the European Patent Office dated Aug. 6, 2019 in counterpart European Patent Application No. EP 17 83 1071.
Xu Meng et al: "Thin Cloud Removal Based on Signal Transmission Principles and Spectral Mixture Analysis", IEEE Transactions on Geoscience and Remote Sensing, IEEE Service Center, vol. 54, No. 3, Mar. 1, 2016, XP011608554, pp. 1659-1669.
Hueni A. et al "The Spectral Database SPECCHIO for Improved Long-Term Usability and Data Sharing", Computers and Geosciences, vol. 35, No. 3, Mar. 1, 2009, XP025980625, pp. 557-565.
Chinese Office Action for CN Application No. 201780045136.6 dated Sep. 2, 2022 with English Translation.
Li Xian-hua et al., "Shadow removal and information recovery for remote sensing images of lunar surface", Journal of Applied Optics, vol. 30 No. 3, May 15, 2009.

* cited by examiner

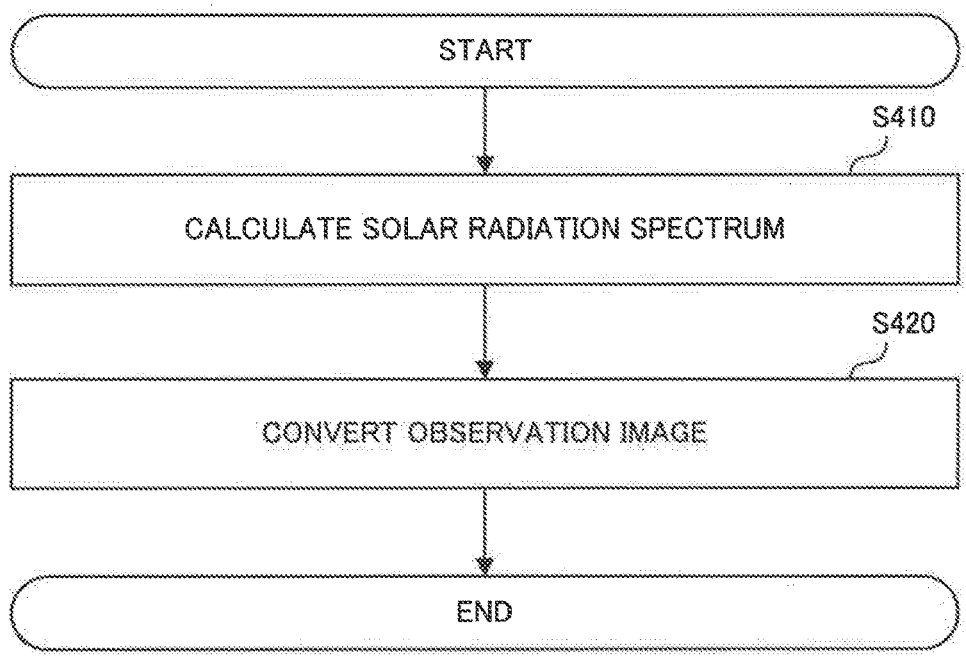
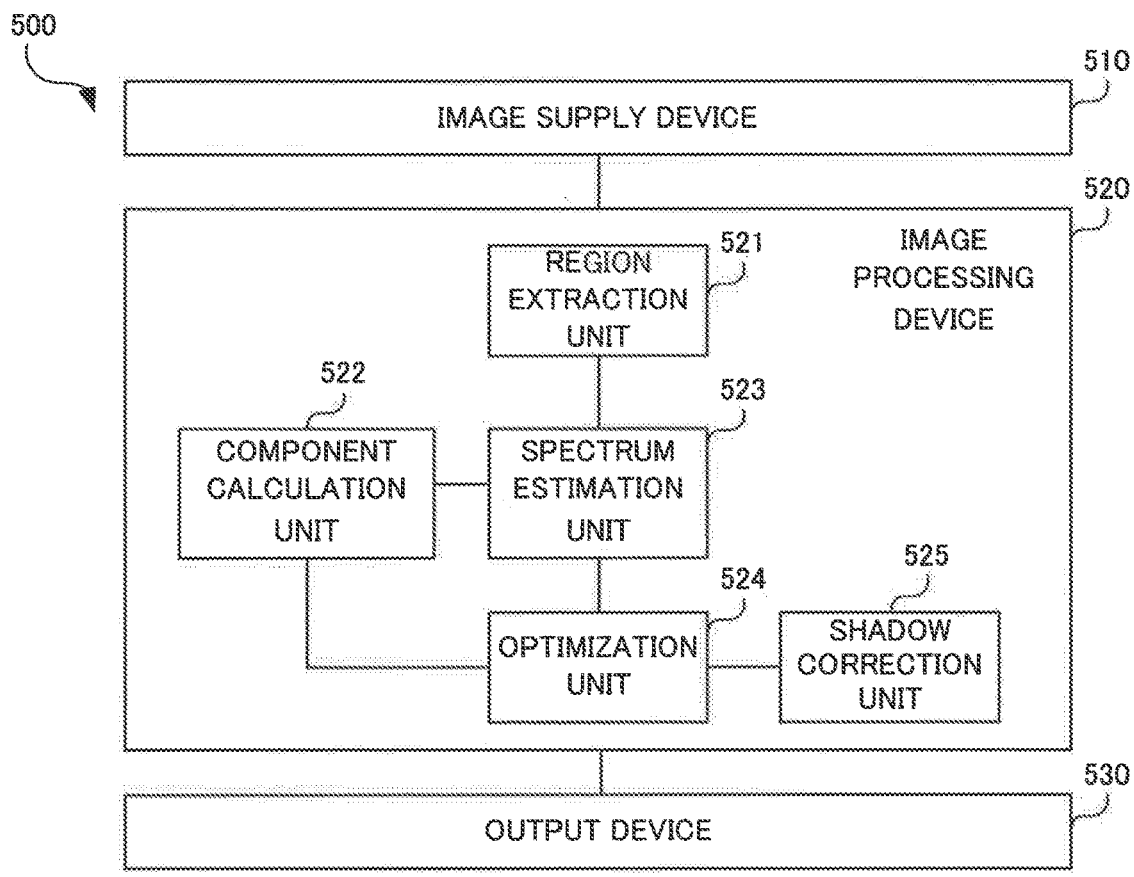

IMAGE PROCESSING DEVICE, IMAGE PROCESSING METHOD, AND RECORDING MEDIUM

CROSS-REFERENCE TO RELATED PATENT APPLICATIONS

This application is a National Stage Entry of International Application No. PCT/JP2017/026195, filed Jul. 20, 2017, which claims priority from Japanese Patent Application No. JP 2016-144486, filed Jul. 22, 2016. The entire contents of the above-referenced applications are expressly incorporated herein by reference.

TECHNICAL FIELD

The present disclosure relates to image processing.

BACKGROUND ART

In an observation image of a ground surface, shadows are included in some cases. In order to observe the ground surface with high accuracy, influence of the shadows needs to be suppressed or eliminated. For example, NPL 1 discloses a technology of classifying high-resolution optical satellite images into shadow regions (shadow areas) and sunlit regions (sunlit areas) and correcting an image for each classified region.

CITATION LIST

Non Patent Literature

[NPL 1] Wen Liu and Fumio Yarnazaki, "Object-Based Shadow Extraction and Correction of High-Resolution Optical Satellite Images", IEEE JOURNAL OF SELECTED TOPICS IN APPLIED EARTH OBSERVATIONS AND REMOTE SENSING, VOL. 5, NO. 4, Aug. 2012, pp. 1296-1302.
[NPL 2] Bird, R. E., and Riordan, C. J. "Simple Solar Spectral Model for Direct and Diffuse irradiance on Horizontal and Tilted Planes at the Earth's Surface for Cloudless Atmospheres", Journal of Climate and Applied Meteorology. Vol, January 1986, pp. 87-97.

SUMMARY OF INVENTION

Technical Problem

In the technology disclosed in NPL 1, it is difficult to correct a difference in fine gradation of shadows with high accuracy.

Meanwhile, the present disclosure provides a technology capable of suppressing influence of shadows with high accuracy.

Solution to Problem

In an aspect, an image processing device is provided. The image processing device includes calculation means for calculating a solar radiation spectrum in a certain region on a ground surface, based on an observation image of the region, a component of a solar radiation spectrum in the region, and a spectrum of a pure substance estimated in the region; and conversion means for converting the observation image, based on the calculated solar radiation spectrum.

In another aspect, an image processing method is provided. The image processing method includes calculating a solar radiation spectrum in a certain region on a ground surface, based on an observation image of the region, a component of a solar radiation spectrum in the region, and a spectrum of a pure substance estimated in the region; and converting the observation image, based on the calculated solar radiation spectrum.

In further another aspect, a recording medium is provided. The recording medium records a program causing a computer to execute: processing of calculating a solar radiation spectrum in a certain region on a ground surface, based on an observation image of the region, a component of a solar radiation spectrum in the region, and a spectrum of a pure substance estimated in the region; and processing of converting the observation image, based on the calculated solar radiation spectrum.

Advantageous Effects of Invention

According to the present disclosure, influence of shadows is suppressed with high accuracy.

BRIEF DESCRIPTION OF DRAWINGS

FIG. 4 is a flowchart illustrating an example of processing executed by the image processing device according to the present disclosure.
FIG. 5 is a block diagram illustrating an example of a configuration of an image processing system in the present disclosure.

EXAMPLE EMBODIMENT

First Example Embodiment

Figure 1:
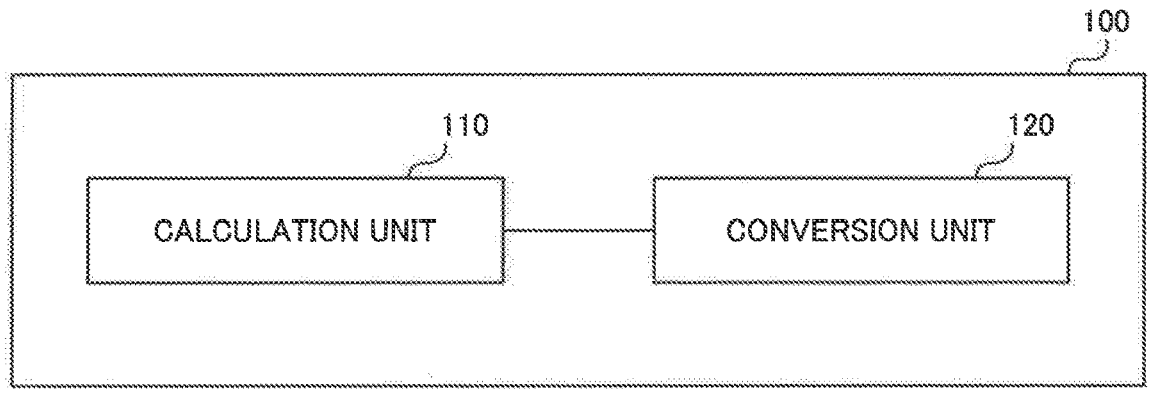
FIG. 1 is a block diagram illustrating an example of a configuration of an image processing device according to the present disclosure.

FIG. 1 is a block diagram illustrating a configuration of an image processing device 100 according to a first example embodiment. The image processing device 100 includes at least a calculation unit 110 and a conversion unit 120. The image processing device 100 may include components other than the calculation unit 110 and the conversion unit 120.

The image processing device 100 is a device configured to convert an observation image containing influence of shadows to another form of information in which the influence is suppressed. Here, the observation image refers to an image of a ground surface captured from the sky. The ground surface referred herein is a surface of the Earth, and is not necessarily limited to a land. The observation image is an image observed by use of an information-gathering satellite such as an optical satellite. The number of colors and a resolution of the observation image are not limited or regulated to specific values.

The calculation unit 110 is configured to calculate a solar radiation spectrum. The solar radiation spectrum is a spectrum of solar light with which the ground surface is irradiated (i.e., solar irradiation). The calculation unit 110 is configured to calculate a solar radiation spectrum of at least one region of the ground surface. Further, the calculation unit 110 may calculate a solar radiation spectrum for each region. The region referred herein may have a specific shape (a rectangular shape of a predetermined size, for example) or a shape different from region to region. In the following description, the region for which the solar radiation spectrum is calculated is also referred to as "observation region".

The calculation unit 110 is configured to calculate the solar radiation spectrum in the observation region, based on an observation image of the region, components of the solar radiation spectrum of the region, and a spectrum of pure substances estimated in the region (hereinafter, also referred to as "pure substance spectrum").

The components of the solar radiation spectrum refer to respective elements in the case where the solar radiation spectrum is expressed with several elements. In some modes, the components of the solar radiation spectrum are calculated based on a predetermined model. For example, when the Bird model proposed by Richard E. Bird et al. (see NPL 2) is used, the solar radiation spectrum in fine weather can be expressed with two components including direct light (direct irradiance) and diffused light (diffuse irradiance). In the case of the Bird model, when a predetermined parameter (zenith angle of the sun or the like) is given, the components of the solar radiation spectrum can be calculated. Note that the model for calculating the components of the solar radiation spectrum is not limited to the Bird model. Further, in the case where the solar radiation spectrum is expressed with vectors, the components of the solar radiation spectrum correspond to base vectors, respectively.

The pure substances in the first example embodiment refer to constituent elements of the ground surface. The pure substances referred herein are also referred to as endmembers. The pure substances referred herein may be chemical substances (a single body or a compound), or may, correspond to respective scenes obtained by classifying the ground surface to several scenes (such as water, soil, vegetation, and artificial objects). Kinds and the number of the pure substances are not particularly limited.

Reflected light, which is observed when solar light enters a certain region of the ground surface and is reflected therefrom, is changed depending on the pure substances constituting the region. In the case where the region includes a plurality of pure substances, the reflected light from the region differs depending on a ratio of the plurality of pure substances.

Figure 2:
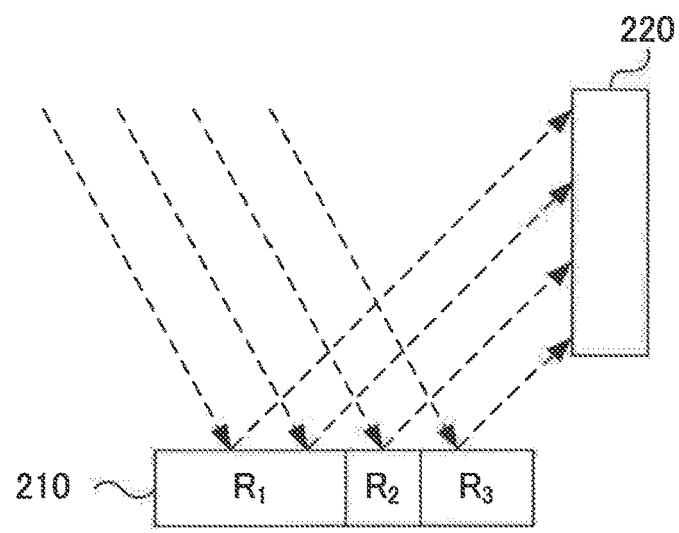
FIG. 2 is a schematic diagram illustrating an example of a relationship between pure substances and an observation image in the present disclosure.

FIG. 2 is a schematic diagram illustrating a relationship between the pure substances and the observation image. In the example illustrated in FIG. 2, it is assumed that a region 210 includes pure substances $R_1$, $R_2$, and $R_3$. Further, it is assumed that abundance levels of the pure substances $R_1$, $R_2$, and $R_3$ in the region 210 are $a_1$, $a_2$, and $a_3$, respectively. The abundance level referred herein is a value that expresses a ratio of each of the pure substances in the observation region. Further, it is assumed that spectra of the pure substances $R_1$, $R_2$, and $R_3$ are $r_1$, $r_2$, and $r_3$, respectively. The pure substance spectra $r_1$, $r_2$, and $r_3$ are vectors that express radiance of the reflected light from the region 210 in a plurality of wavelength bands. Note that, in this example, it is assumed that the influence of the shadows is not caused to the observation image.

A sensor 220 includes a plurality of pixels. Further, in general, an area of the ground surface corresponding to one pixel is large enough for an area of the pixel. The region 210 may be formed of a single pure substance microscopically. However, when viewed with a size corresponding to one pixel, the region 210 may be formed of a combination of the plurality of pure substances.

Thus, the observation image of the region 210, which is observed by the sensor 220, is expressed with a linear sum of the abundance levels $a_1$, $a_2$, and $a_3$ and the pure substance spectra $r_1$, $r_2$, and $r_3$ of the pure substances $R_1$, $R_2$, and $R_3$. Specifically, the observation image of the region 210 is $a_1 r_1 + a_2 r_2 + a_3 r_3$. However, the abundance levels $a_1$, $a_2$, and $a_3$ may be "0" depending on pixels.

The calculation unit 110 is configured to calculate $a_m$ and $b_p$ for minimizing a norm of a model error e, based on, for example, an observation model expressed in Equation (1) below. In other words, the calculation unit 110 is configured to calculate the solar radiation spectrum for each pixel by solving an optimization problem expressed in Equation (1).

[Math. 1]

$$x = \sum_{m=1}^{M} a_m r_m \circ \sum_{p=1}^{P} b_p i_p + e \quad (1)$$

Note that, in Equation (1), the followings are defined.
x: a spectrum of each pixel of an observation image,
$a_m$: a weight coefficient (abundance level) of a pure substance spectrum,
$r_m$: a pure substance spectrum [dimensionless],
M: the estimable number of the pure substances,
$b_p$: a weight coefficient of components of a solar radiation spectrum,
$i_p$: a component of the solar radiation spectrum,
P: the number of components of the solar radiation spectrum, and
e: a model error.

Further, the spectrum x of the pixel, the pure substance spectrum $r_m$, and the component $i_p$ of the solar radiation spectrum are vectors having elements whose number is the same as the number of the bands. The spectrum x of the pixel expresses radiance of the plurality of bands with vectors.

Figure 3:
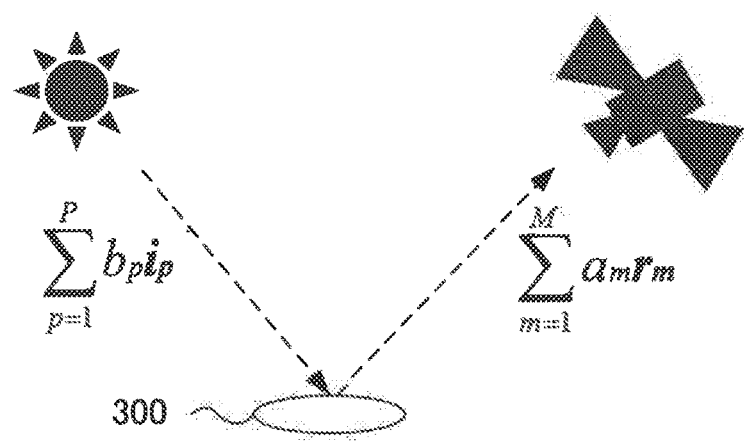
FIG. 3 is an explanatory diagram illustrating an example of an observation model in the present disclosure.

FIG. 3 is an explanatory diagram illustrating the observation model expressed in Equation (1). A total sum of a product of the component $i_p$ of the solar radiation spectrum and the weight coefficient $b_p$ corresponds to the solar radiation spectrum in an observation region 300. Here, the weight coefficient $b_p$ corresponds to thickness of the shadows. The weight coefficient $b_p$ regarding direct components approaches "0" as the shadows are thick (i.e., the influence of the shadows is large), and approaches "1" as the shadows are thin (i.e., the influence of the shadows is small).

A total sum of a product of the weight coefficient $a_m$ of the pure substance spectrum and the pure substance spectrum $r_m$, corresponds to a spectrum of a reflectance of the observation region 300. The spectrum depends only on features of the pure substances constituting the observation region 300, and does not depend on solar radiation. In the observation model expressed in Equation (1), the spectrum of the observation image is expressed with a Hadamard product (and the model error e) of the spectrum of the reflectance of the observation region 300 and the solar radiation spectrum.

The conversion unit 120 is configured to convert the observation image to another form of information. In some modes, the conversion unit 120 corrects the observation image based on the solar radiation spectrum calculated by the calculation unit 110 in order to suppress the influence of the shadows. In more detail, from among the pixels forming the observation image, the conversion unit 120 corrects a pixel which has an observed luminance value smaller (i.e., darker) than an ideal luminance value to be observed in fine weather, so that the pixel becomes closer to the ideal luminance value.

Alternatively, the conversion unit 120 may convert an observation image with the influence of the shadows to another form of information in which the influence of the shadows is suppressed. The other form of information referred herein may be, for example, a spectrum of a reflectance of the observation region, i.e., a total sum of a product of the weight coefficient $a_m$ of the pure substance spectrum and the pure substance spectrum $r_m$.

FIG. 4 is a flowchart illustrating processing executed by the image processing device 100. The image processing device 100 starts execution of the processing at a timing such as a timing when the observation image is input and a timing designated by a user.

In Step S410, the calculation unit 110 is configured to calculate the solar radiation spectrum in the observation region. For example, the calculation unit 110 is configured to calculate the solar radiation spectrum in the observation region for each pixel. Alternatively, the calculation unit 110 may calculate the solar radiation spectrum for several adjacent pixels (four pixels including two pixels arranged longitudinally and two pixels arranged laterally, for example).

In Step S420, the conversion unit 120 is configured to convert the observation image. The conversion unit 120 is configured to convert the observation image, based on the solar radiation spectrum calculated in Step S410.

According to the first example embodiment, the image processing device 100 can suppress the influence of the shadows at high accuracy. The image processing device 100 can estimate the influence of the shadows for each component of the solar radiation spectrum, therefore, accuracy of suppression can be improved.

Thickness of the shadows formed in the observation region differs depending on various conditions of the region. For example, in the case where a range corresponding to one pixel in the observation region includes both sunlit and shadow regions, a luminance value of the pixel becomes an intermediate value between a luminance value corresponding to the sunlit region and a luminance value corresponding to the shadow region. Further, the thickness of the shadows formed in the observation region is changed depending on inclination of the region and a difference of a sky factor determined by surrounding trees, buildings, and the like. Thus, in the thickness of the shadows formed in the observation region, a fine change that cannot be expressed (reproduced) may be caused depending on a classification of the region.

The image processing device 100 uses a model that expresses a change of the solar radiation spectrum with a sequential change of a parameter, estimates the parameter for each pixel, and accordingly, estimates a fine change of the solar radiation spectrum. In this manner, the image processing device 100 can suppress the influence of the shadows formed in the observation image.

Second Example Embodiment

FIG. 5 is a block diagram illustrating a configuration of an image processing system 500 in another example embodiment. The image processing system 500 includes an image supply device 510, an image processing device 520, and an output device 530.

The image supply device 510 is configured to supply observation data indicating the observation image to the image processing device 520. The image supply device 510 is, for example, a database in which the observation data are accumulated. The image processing device 520 is configured to correct the observation image, based on the observation data supplied from the image supply device 510. The output device 530 is configured to output the observation image corrected by the image processing device 520. The output device 530 is, for example, a display device configured to display the corrected observation image. Further, the output device 530 may be a recording device configured to record the observation data indicating the corrected observation image in a recording medium.

In the second example embodiment, the observation image is an image which is observed by an artificial satellite and expressed with electronic waves in a plurality of wavelength bands. In general, such observation image is also referred to as a multi-spectrum image or a hyper spectrum image. However, the number of wavelength bands expressing the observation image (hereinafter, also referred to as "band number") is not particularly limited to a specific value. Further, a maximum wavelength band and a minimum wavelength band, which express the observation image, are not limited to specific values. The observation image includes a plurality of observation regions.

The observation data include image information indicating the observation image (a luminance value, for example) and meta information. The meta information includes, for example, information on the observation regions. The meta information on the observation regions includes observation date and time, a location (a latitude and a longitude), a zenith angle of the sun, a water vapor amount, a temperature, an azimuthal angle of the sun, a zenith angle and an azimuthal angle of the artificial satellite, and the like. The observation data in the second example embodiment include at least the meta information required for executing the processing to be described later.

In more detail, the image processing device 520 includes a region extraction unit 521, a component calculation unit 522, a spectrum estimation unit 523, an optimization unit 524, and a shadow correction unit 525. Among those, the region extraction unit 521, the component calculation unit 522, the spectrum estimation unit 523, and the optimization unit 524 may correspond to an example of the calculation unit 110 described in the first example embodiment. Further, the shadow correction unit 525 corresponds to an example of the conversion unit 120 described in the second example embodiment.

The region extraction unit 521 is configured to extract, from the observation image, a region which satisfies a specific condition. The region extraction unit 521 is configured to extract, from the observation image, a region in which it is estimated that solar radiation is less blocked. For example, the region extraction unit 521 is configured to extract a region having a total sum of luminance values of the bands of the observation image, which is equal to or larger than a predetermined threshold value. Alternatively, the region extraction unit 521 may extract a region based on luminance values of the predetermined number of bands which is smaller than the number of bands of the observation image. The region extracted by the region extraction unit 521 is hereinafter referred to as "specific region." The specific region is at least a part of the observation region.

The component calculation unit 522 is configured to calculate the components of the solar radiation spectrum. The component calculation unit 522 is configured to calculate the components of the solar radiation spectrum by use of the meta information included in the observation data. The component calculation unit 522 can calculate direct components and diffuse components of the solar radiation spectrum, based on the Bird model by use of the zenith angle of the sun (or the meta information enabling to calculate the zenith angle of the sun).

In order to calculate the direct components and the diffuse components with the Bird model, an atmospheric condition and the like are required to be given in addition to the zenith angle of the sun. The atmospheric condition is determined by parameters (perceptible water vapor (PWV), atmospheric pressure, atmospheric turbidity, and the like) indicating an atmospheric state. However, the atmospheric condition has less influence on the solar radiation spectrum as compared to the zenith angle of the sun, Therefore, the atmospheric condition can be regarded as a constant in the Bird model.

In other words, at the time of calculating the direct components and the diffuse components, the influence of the zenith angle of the sun is dominant. Thus, the component calculation unit 522 can calculate the direct components and the diffuse components by acquiring the zenith angle of the sun in the observation region from the meta information in the observation data.

The direct components and the diffuse components calculated by the component calculation unit 522 indicate the solar radiation spectrum when it is assumed that blocking is not caused by any covers. The covers referred herein are, for example, cloud in the atmosphere and obstacles forming shadows. The solar radiation spectrum can also be regarded as the solar radiation spectrum in fine weather or the solar radiation spectrum in the sunlit region (i.e., a region in which no shadows are formed). The solar radiation spectrum indicated by the direct components and the diffuse components is a so-called ideal spectrum, and hence, does not necessarily match with the actual solar radiation spectrum of the ground surface.

The spectrum estimation unit 523 is configured to estimate the pure substance spectrum. The spectrum estimation unit 523 is configured to estimate the pure substance spectrum by use of the observation image of the specific region extracted by the region extraction unit 521 from the observation region and the components of the solar radiation spectrum calculated by the component calculation unit 522. At the time of estimating the pure substance spectrum, the spectrum estimation unit 523 assumes that the total number of pure substances in the observation region is sufficiently small. Specifically, the spectrum estimation unit 523 assumes that the total number of pure substances in the observation region is equal to or smaller than the number of bands.

In the second example embodiment, the spectrum estimation unit 523 generates a reflectance image by use of the observation image and the solar radiation spectrum component of the specific region, and estimates the pure substance spectrum by use of the generated reflectance image.

The spectrum estimation unit 523 assumes that the solar radiation spectrum is the solar radiation spectrum in fine weather or the solar radiation spectrum in the sunlit region (i.e., a region in which no shadows are formed). In this case, in Equation (1), $b_1'b_2=1$ is satisfied. The spectrum estimation unit 523 calculates Equation (2) described below from Equation (1) under the condition satisfying $b_1'b_2=1$. Then, the spectrum estimation unit 523 generates the reflectance image in accordance with Equation (2) described below, $$y'(L_n) = y(L_n) \cdot \frac{1}{i_1(L_n) + i_2(L_n)} \quad (2)$$

Note that, in Equation (2), the followings are defined,
$L_n$: a wavelength (n=1 to N),
$Y'(L_n)$: a spectrum of the reflectance image in the wavelength $L_n$ [nondimensional],
$y(L_n)$: a spectrum of the observation image in the wavelength $L_n$,
$i_1(L_n)$: direct components of the solar radiation spectrum in the wavelength $L_n$, and
$i_2(L_n)$: diffuse components of the solar radiation spectrum in the wavelength $L_n$.

When the reflectance image is generated, the spectrum estimation unit 523 estimates the pure substance spectrum based on the reflectance image by use of an unmixing method. The spectrum estimation unit 523 may use known unmixing methods such as a vertex component analysis (VCA), an N-FINDER, a pixel purity index (PPI), and a minimum volume transformation (MVT).

The optimization unit 524 is configured to calculate the solar radiation spectrum for each pixel. The optimization unit 524 is configured to calculate the solar radiation spectrum for each pixel by use of the observation image, the components of the solar radiation spectrum calculated by the component calculation unit 522, and the pure substance spectrum estimated by the spectrum estimation unit 523.

Similarly to the calculation unit 110 in the first example embodiment, the optimization unit 524 can calculate the solar radiation spectrum for each pixel by solving the optimization problem expressed in Equation (1). However, in the second example embodiment, the value of P is "2". The optimization unit 524 can specify the influence of the shadows for each pixel (i.e., an amount reduced from the ideal solar radiation spectrum in fine weather or the like) by calculating the weight coefficient $b_1$ and the weight coefficient $b_2$.

The shadow correction unit 525 is configured to correct the observation image. The shadow correction unit 525 is configured to correct the observation image for each pixel by use of the solar radiation spectrum for each pixel calculated by the optimization unit 524. The shadow correction unit 525 may correct a part of the observation image instead of the entire observation image. For example, the shadow correction unit 525 may omit correction for the specific region extracted by the region extraction unit 521 because the influence of the shadows is regarded to be small.

For example, the shadow correction unit 525 suppresses the influence of the shadows contained in the spectrum of the observation image in accordance with Equation (3) described below, $$x'(L_n) = x(L_n) \cdot \frac{i_1(L_n) + i_2(L_n)}{b_1 i_1(L_n) + b_2 i_2(L_n)} \quad (3)$$

Note that, in Equation (3), the followings are defined.

$L_n$: the wavelength (n=1 to N), $x'(L_n)$: a spectrum of the observation image after correction in the wavelength $L_n$, $x(L_n)$: a spectrum of the observation image before correction in the wavelength $L_n$, $i_1(L_n)$: the direct components of the solar radiation spectrum in the wavelength $L_n$, $i_2(L_n)$: the diffuse components of the solar radiation spectrum in the wavelength $L_n$, $b_1$: the weight coefficient of the direct components (equal to or larger than 0 and equal to or smaller than 1), and $b_2$: the weight coefficient of the diffuse components (equal to or larger than 0 and equal to or smaller than 1).

Alternatively, the shadow correction unit 525 may correct the observation image to a value obtained by subtracting the components of the solar radiation spectrum (i.e., $i_1(L_n)+i_2(L_n)$) from Equation (3), In other words, the shadow correction unit 525 may correct the observation image in accordance with Equation (4) described below. $x'(L_n)$ in Equation (4) indicates a spectrum of a reflectance of the observation in region, which depends only on features of the observation region.

$$x''(L_n) = x(L_n) \cdot \frac{1}{b_1 i_1(L_n) + b_2 i_2(L_n)} \quad (4)$$

(Here, x" is a value of a nondimensional spectrum)

Figure 6:
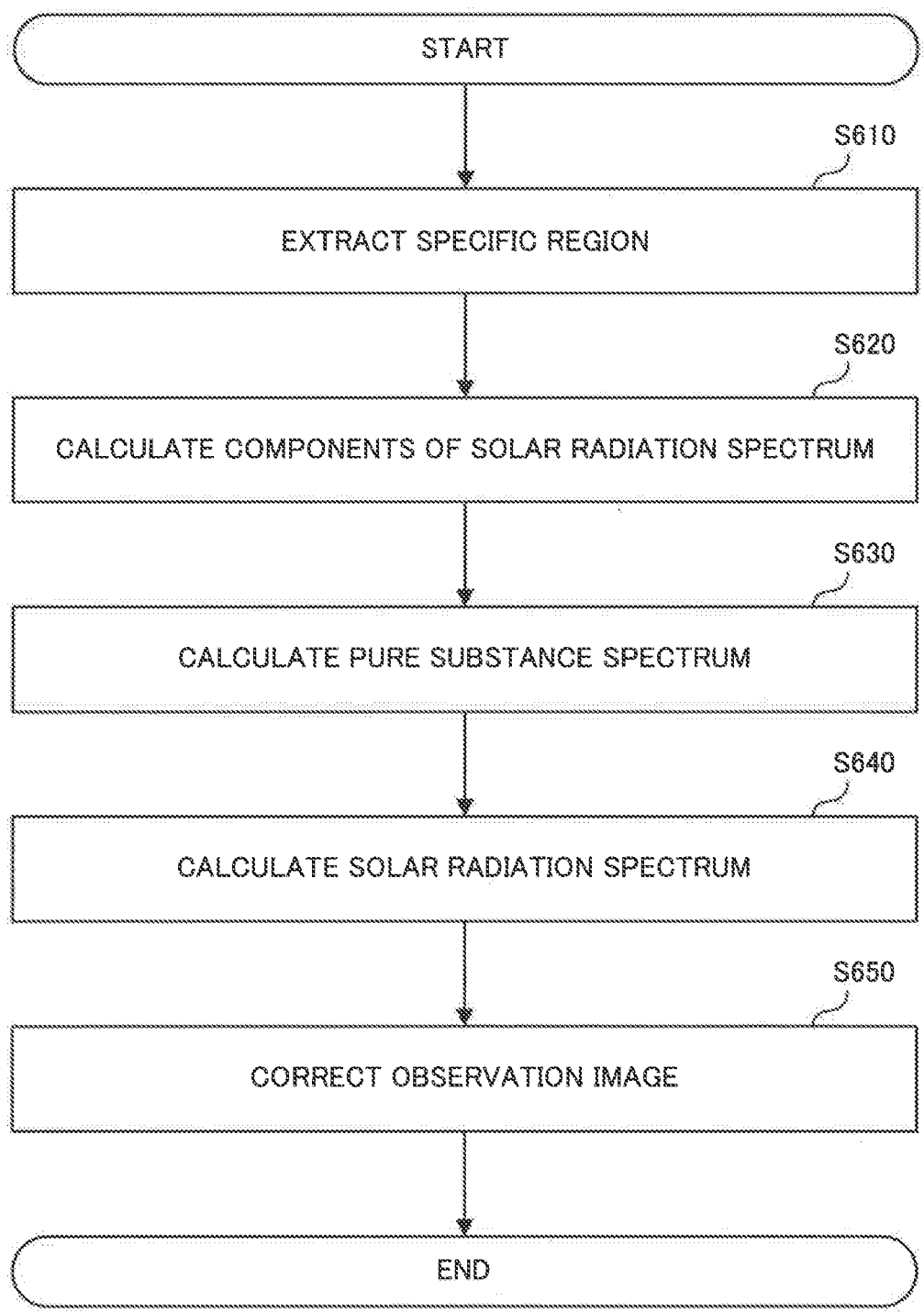
FIG. 6 is a flowchart illustrating another example of processing executed by the image processing device according to the present disclosure.

FIG. 6 is a flowchart illustrating processing executed by the image processing device 520, The image processing device 520 executes the processing illustrated in FIG. 6 for each observation region included in the observation image. Note that the order of executing the processing by the image processing device 520 is not limited to the order illustrated in FIG. 6. It is possible for the image processing device 520 to switch the execution order of the steps without causing any technical contradiction. Further, the image processing device 520 may execute a plurality of steps in parallel.

In Step S610, the region extraction unit 521 extracts the specific region from the observation region. In Step S620, the component calculation unit 522 calculates the direct components and the diffuse components of the solar radiation spectrum with reference to the zenith angle of the sun in the observation region, Note that in a strict sense, the zenith angle of the sun differs from pixel to pixel forming the observation region. However, the zenith angles of the sun corresponding to the respective pixels are regarded to be approximately equal to each other in the second example embodiment, and hence, a common value is used.

In Step S630, the spectrum estimation unit 523 calculates the pure substance spectrum based on the specific region extracted in Step S610 and the components of the solar radiation spectrum extracted in Step S620. In Step S640, the optimization unit 524 calculates the solar radiation spectrum for each pixel. The optimization unit 524 calculates the solar radiation spectrum for each pixel by applying the optimization problem based on the image information on the observation region, the components of the solar radiation spectrum calculated in Step S620, and the pure substance spectrum calculated in Step S630.

In Step S650, the shadow correction unit 525 corrects the observation image. The shadow correction unit 525 corrects the observation image for each pixel based on the solar radiation spectrum calculated in Step S640. The shadow correction unit 525 outputs the image information indicating the observation image after correction.

The image processing system 500 in the second example embodiment has a configuration of extracting the specific region and estimating the pure substance spectrum based on the observation image of the extracted specific region. With this configuration, the pure substance spectrum can be estimated with high accuracy. Further, the image processing system 500 can calculate the components of the solar radiation spectrum based on the zenith angle of the sun. The zenith angle of the sun is included in the general meta information in the observation data, or can be specified based on the general meta information.

Third Example Embodiment

Figure 7:
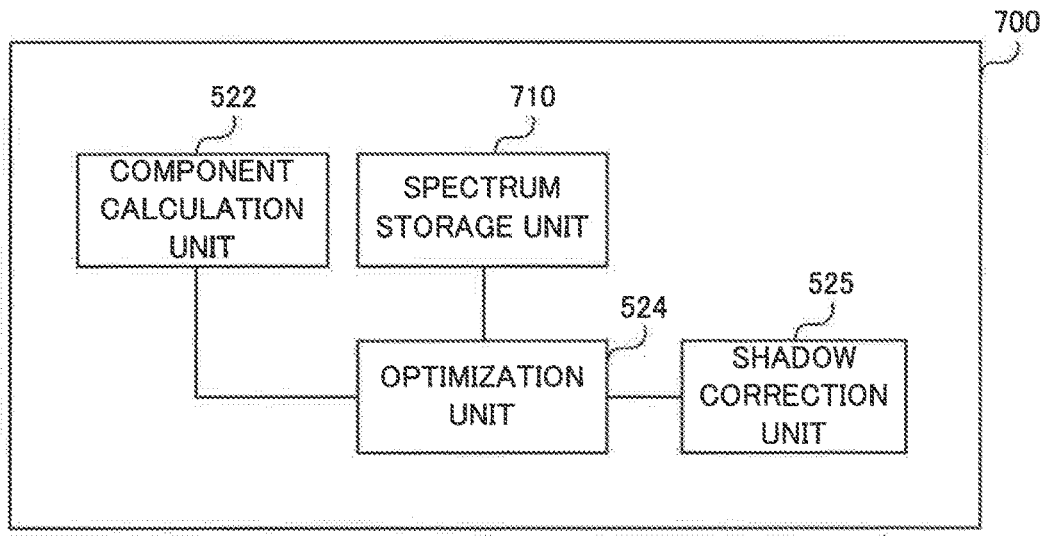
FIG. 7 is a block diagram illustrating another example of a configuration of the image processing device according to the present disclosure.

FIG. 7 is a block diagram illustrating a configuration of an image processing device 700 according to still another example embodiment. The image processing device 700 has a configuration common with that of the image processing device 520 in the second example embodiment. Specifically, the image processing device 700 is common with the image processing device 520 in that the component calculation unit 522, the optimization unit 524, and the shadow correction unit 525 are included. Further, the image processing device 700 is different from the image processing device 520 in that a spectrum storage unit 710 is included in place of the region extraction unit 521 and the spectrum estimation unit 523. The component calculation unit 522, the optimization unit 524, and the shadow correction unit 525 are operated similarly to the description in the second example embodiment.

The spectrum storage unit 710 is configured to store the pure substance spectra. The spectrum storage unit 710 is configured to store, in advance, the spectra of the pure substances estimated to be included in the observation regions so that the pure substance spectra can be supplied to the optimization unit 524, The spectrum storage unit 710 may store a set of the pure substance spectra corresponding to a classification of the observation region.

The classification of the observation region referred herein represents attributes of the observation regions, which are characterized with substances constituting the surface of the ground (hereinafter, also referred to as "ground covering objects"), such as "urban area" including a relatively large number of artificial objects such as buildings, "vegetation" including a relatively large number of plants, and "soil" in which the soil is exposed. When the attributes of the observation regions are different from each other, a combination of the pure substances included in the regions differs. Note that the ground covering objects may be classified more finely, like classifying "vegetation" into "coniferous forests" and "broad-leaved forests", for example.

In the case where a set of the pure substance spectra corresponding to the classification of the observation region is stored, the spectrum storage unit 710 may specify the classification of the observation region based on the meta information, and may supply, to the optimization unit 524, the set of the pure substance spectra corresponding to the specified classification. In this case, the spectrum storage unit 710 may specify the classification of the observation region based on the meta information indicating the locations (latitudes and longitudes) of the observation regions. Alternatively, the meta information may include the meta information corresponding to the classification of the observation region.

Figure 8:
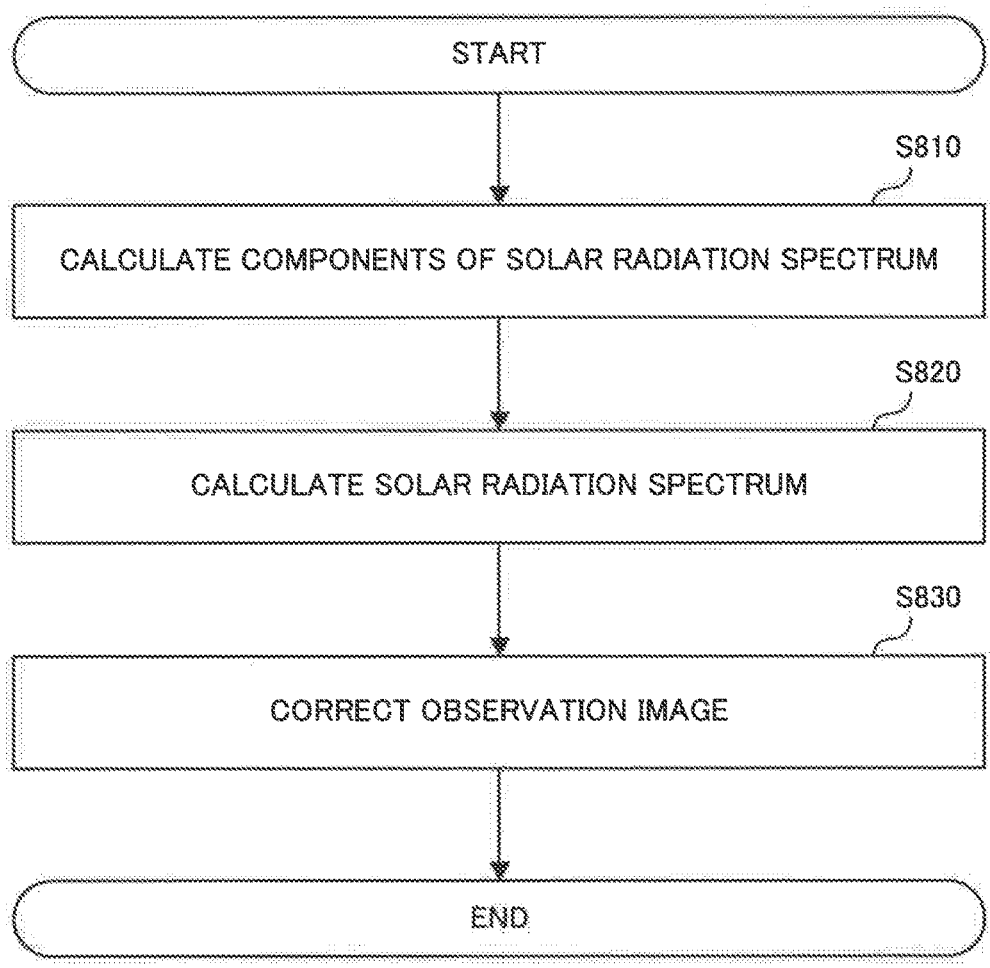
FIG. 8 is a flowchart illustrating still another example of processing executed by the image processing device according to the present disclosure.

FIG. 8 is a flowchart illustrating processing executed by the image processing device 700. In Step S810, the component calculation unit 522 calculates the direct components and the diffuse components of the solar radiation spectrum. Step S810 is similar to the processing in Step S620 in the second example embodiment.

In Step S820, the optimization unit 524 calculates the solar radiation spectrum for each pixel. In Step S820, the optimization unit 524 reads out the set of the pure substance spectra stored in the spectrum storage unit 710, and calculates the solar radiation spectra based on the read pure substance spectra. Step S820 is similar to the processing in Step S640 in the second example embodiment except for the point in which the pure substance spectrum substituted in Equation (1) is the pure substance spectra stored in the spectrum storage unit 710.

In Step S830, the shadow correction unit 525 corrects the observation image. Step S830 is similar to the processing in Step S650 in the second example embodiment. The shadow correction unit 525 outputs the image information indicating the corrected observation image. The shadow correction unit 525 may output the meta information in addition to the image information.

The image processing device 700 according to the third example embodiment has a configuration of calculating the solar radiation spectrum for each pixel by use of the pure substance spectrum stored in advance. With this configuration, as compared to the configuration in the second example embodiment (see FIG. 5), a configuration and processing for calculating (estimating) the pure substance spectrum are not required. The image processing device 700 is not required to calculate the pure substance spectrum, and hence, the specific region required for calculating the pure substance spectrum is not needed.

Modification Example

The present disclosure is not limited to the first example embodiment to the third example embodiment described above. The present disclosure may include modes applied with modification or application that the person skilled in the art can grasp. For example, the present disclosure includes modification examples described below. Further, the present disclosure may include modes obtained by appropriately combining matters described in Description as needed. For example, matters described in specific example embodiments may be applied to another example embodiment within the range of not causing any contradiction.

Modification Example 1

The image processing device according to the present disclosure may include both the configuration in the second example embodiment (see FIG. 5) and the configuration in the third example embodiment (see FIG. 7). In other words, the image processing device is configured to read out a part of the spectra of NI pure substances, which is used in Equation (1), from the spectrum storage unit 710 and estimate the remaining spectra with the spectrum estimation unit 523.

For example, the image processing device according to Modification Example 1 may read out a general or representative pure substance spectrum, which may be included in any observation region, from the spectrum storage unit 710, and may estimate the remaining pure substance spectra with the spectrum estimation unit 523. Alternatively, the image processing device according to Modification Example 1 may perform selection by reading out a part of the spectra of the M pure substances (the pure substance spectrum unique to the classified observation region, for example) from the spectrum storage unit 710, based on the classification of the observation region depending on the ground covering objects. The classification of the observation region is specified from the location of the region.

Modification Example 2

The spectrum estimation unit 523 may estimate the pure substance spectrum based on information indicating a shape of the pure substance spectrum. Such information is referred to as "hint information" in the following description.

The hint information is an image feature value specified based on the observation image, for example. The image feature value may be a feature value indicating a color of the observation region or a feature value indicating an edge or texture. With such image feature value, the ground covering objects can be estimated in some cases.

Modification Example 3

A specific hardware configuration of the image processing device according to the present disclosure includes different sorts of variations, and is not limited to a specific configuration. For example, the image processing device according to the present disclosure may be achieved by use of software, or may be formed in such a way that various kinds of processing are shared by use of a plurality of kinds of hardware.

Figure 9:
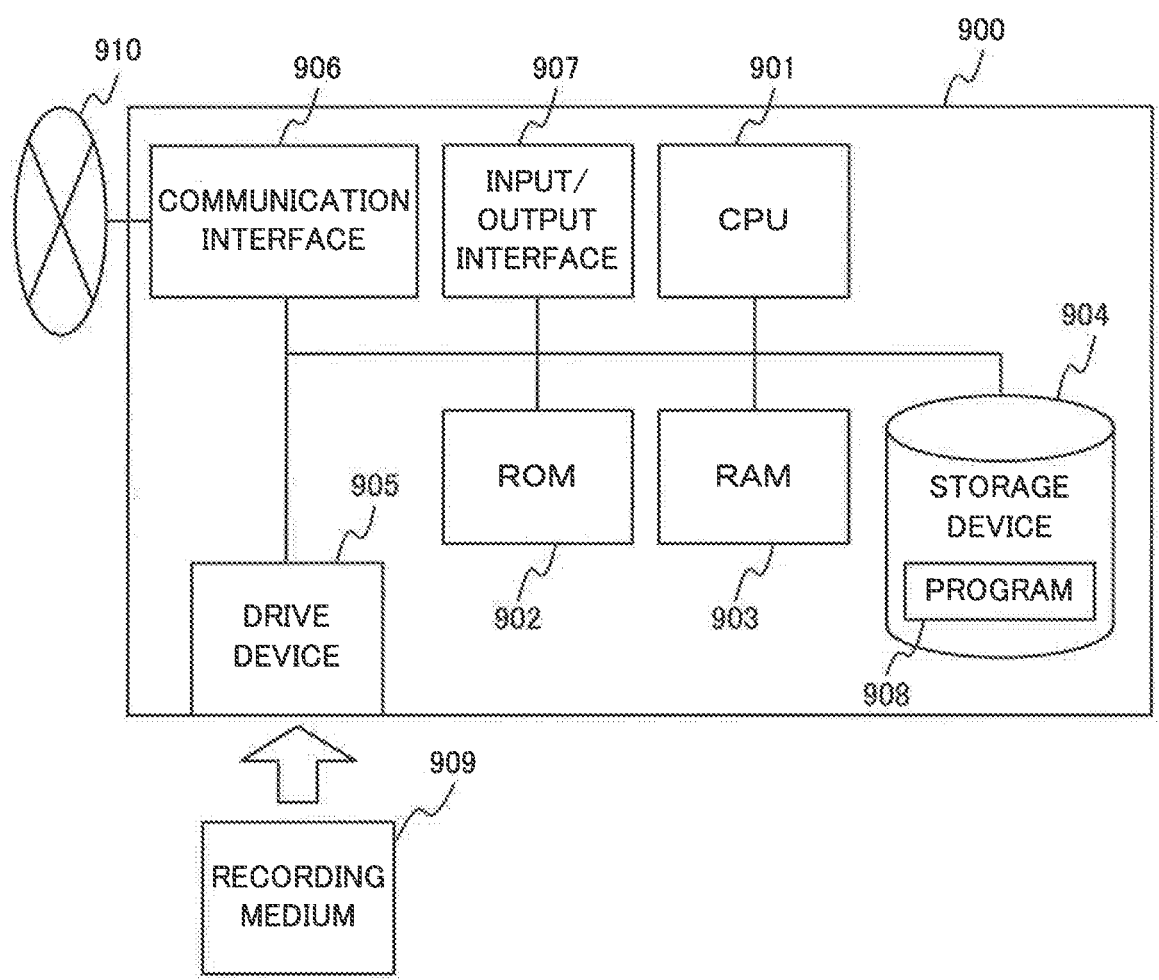
FIG. 9 is a block diagram illustrating an example of a hardware configuration of a computer device in the present disclosure.

FIG. 9 is a block diagram illustrating an example of a hardware configuration of a computer device 900 for achieving the image processing device according to the present disclosure. The computer device 900 includes a central processing unit (CPU) 901, a read only memory (ROM) 902, a random access memory (RAM) 903, a storage device 904, a drive device 905, a communication interface 906, and an input/output interface 907. The image processing device according to the present disclosure may be achieved by the configuration (or part of the configuration) illustrated in FIG. 9.

The CPU 901 executes a program 908 by use of the RAM903. The program 908 may be stored in the ROM902. Further, the program 908 may be recorded in a recording medium 909 such as a memory card to be read out by the drive device 905, or may be transmitted from an external device through a network 910, The communication interface 906 exchanges the data with the external device through the network 910. The input/output interface 907 exchanges the data with peripheral devices (an input device and a display device, for example). The communication interface 906 and the input/output interface 907 can function as components for acquiring or outputting the data.

Note that the components of the image processing device according to the present disclosure may include a single circuitry (processor and the like) or may include a combination of a plurality of circuitries. The circuitry referred herein may be any of dedicated one and general-use one. For example, a part of the image processing device according to the present disclosure may be achieved by a dedicated processor, and the other part thereof may be achieved by a general-use processor.

The configuration described as a single device in the above-mentioned example embodiments may be provided separately as a plurality of devices. For example, the image processing device 100, 520, or 700 may be achieved by a plurality of computer devices by use of a cloud computing technology.

As described above, the present invention is described with the above-mentioned example embodiments as model examples. However, the present invention is not limited to the above-mentioned example embodiments. That is, various modes that a person skilled in the art can understand are applicable, to the present invention within a scope of the present invention.

The example embodiments of the above-mentioned present invention may be described as in the following supplementary notes, but are not limited to the following.

Supplementary Note 1

An image processing device comprising:
calculation means for calculating a solar radiation spectrum in a certain region on a ground surface, based on an observation image of the region, a component of a solar radiation spectrum in the region, and a spectrum of a pure substance estimated in the region; and
conversion means for converting the observation image, based on the calculated solar radiation spectrum.

Supplementary Note 2

The image processing device according to supplementary note 1, further comprising:
extraction means for extracting, from the observation image, a specific region in which solar radiation is less blocked; and
estimation means for estimating a spectrum of the pure substance by use of the observation image of the extracted specific region, wherein
the calculation means calculates the solar radiation spectrum, based on the observation image, a component of the solar radiation spectrum, and the estimated spectrum of the pure substance.

Supplementary Note 3

The image processing device according to supplementary note 1 or 2, wherein
the calculation means calculates a spectrum of the pure substance by solving an optimization problem for minimizing an error in a predetermined model.

Supplementary Note 4

The image processing device according to any one of supplementary notes 1 to 3, wherein
the calculation means calculates a component of the solar radiation spectrum, based on a zenith angle of the sun in the region.

Supplementary Note 5

The image processing device according to any one of supplementary notes 1 to 4, wherein
the calculation means selects at least a part of a spectrum of the pure substance depending on a location of the region.

Supplementary Note 6

The image processing device according to any one of supplementary notes 1 to 5, wherein the calculation means selects at least a part of a spectrum of the pure substance, based on a classification of the region depending on a ground covering object.

Supplementary Note 7

The image processing device according to any one of supplementary notes 1 to 6, wherein
the calculation means reads out at least a part of a spectrum of the pure substance from storage means.

Supplementary Note 8

The image processing device according to any one of supplementary notes 1 to 7, wherein
the observation image includes a plurality of pixels, and
the calculation means calculates the solar radiation spectrum for each of the plurality of pixels by use of a common value between a component of the solar radiation spectrum and a spectrum of the pure substance for the plurality of pixels.

Supplementary Note 9

An image processing method comprising:
calculating a solar radiation spectrum in a certain region on a ground surface, based on an observation image of the region, a component of a solar radiation spectrum in the region, and a spectrum of a pure substance estimated in the region; and
converting the observation image, based on the calculated solar radiation spectrum.

Supplementary Note 10

The image processing method according to supplementary note 9, further comprising:
extracting, from the observation image, a specific region in which solar radiation is less blocked;
estimating a spectrum of the pure substance by use of the observation image of the extracted specific region; and
calculating the solar radiation spectrum, based on the observation image, a component of the solar radiation spectrum, and the estimated spectrum of the pure substance.

Supplementary Note 11

The image processing method according to supplementary note 9 or 10, further comprising
calculating a spectrum of the pure substance by solving an optimization problem for minimizing an error in a predetermined model.

Supplementary Note 12

The image processing method according to any one of supplementary notes 9 to 11, further comprising calculating a component of the solar radiation spectrum, based on a zenith angle of the sun in the region.

Supplementary Note 13

The image processing method according to any one of supplementary notes 9 to 12, further comprising
selecting at least a part of a spectrum of the pure substance depending on a location of the region.

Supplementary Note 14

The image processing method according to any one of supplementary notes 9 to 13, further comprising
selecting at least a part of a spectrum of the pure substance, based on a classification of the region depending on a ground covering object.

Supplementary Note 15

The image processing method according to any one of supplementary notes 9 to 14, further comprising
reading out at least a part of a spectrum of the pure substance from storage means.

Supplementary Note 16

The image processing method according to any one of supplementary notes 9 to 15, wherein
the region includes a plurality of pixels, and
the image processing method further comprises calculating the solar radiation spectrum for each of the plurality of pixels by use of a common value between a component of the solar radiation spectrum and a spectrum of the pure substance for the plurality of pixels.

Supplementary Note 17

A recording medium recording a program causing a computer to execute:
processing of calculating a solar radiation spectrum in a certain region on a ground surface, based on an observation image of the region, a component of a solar radiation spectrum in the region, and a spectrum of a pure substance estimated in the region; and
processing of converting the observation image, based on the calculated solar radiation spectrum.

Supplementary Note 18

The recording medium according to supplementary note 17, further causing the computer to execute:
processing of extracting, from the observation image, a specific region in which solar radiation is less blocked; and
processing of estimating a spectrum of the pure substance by use of the observation image of the extracted specific region, wherein,
in the processing of calculating, the computer is caused to calculate the solar radiation spectrum, based on the observation image, a component of the solar radiation spectrum, and the estimated spectrum of the pure substance.

Supplementary Note 19

The recording medium according to supplementary note 17 or 18, further causing the computer to,
in the processing of calculating, calculate a spectrum of the pure substance by solving an optimization problem for minimizing an error in a predetermined model.

Supplementary Note 20

The recording medium according to any one of supplementary notes 17 to 19, further causing the computer to,
in the processing of calculating, calculate a component of the solar radiation spectrum, based on a zenith angle of the sun in the region.

Supplementary Note 21

The recording medium according to any one of supplementary notes 17 to 20, further causing the computer to,
in the processing of calculating, select at least a part of a spectrum of the pure substance depending on a location of the region.

Supplementary Note 22

The recording medium according to any one of supplementary notes 17 to 21, further causing the computer to,
in the processing of calculating, select at least a part of a spectrum of the pure substance, based on a classification of the region depending on a ground covering object.

Supplementary Note 23

The recording medium according to any one of supplementary notes 17 to 22, further causing the computer to,
in the processing of calculating, read out at least a part of a spectrum of the pure substance from storage means.

Supplementary Note 24

The recording medium according to any one of supplementary notes 17 to 23, wherein
the region includes a plurality of pixels, and
the recording medium further causes the computer to, in the processing of calculating, calculate the solar radiation spectrum for each of the plurality of pixels by use of a common value between a component of the solar radiation spectrum and a spectrum of the pure substance for the plurality of pixels.

This application is based upon and claims the benefit of priority from Japanese patent application (Japanese patent application No. 2016-144486), filed on Jul. 22, 2016, the disclosure of which is incorporated herein in its entirety by reference.

REFERENCE SIGNS LIST

100, 520, 700 Image processing device
110 Calculation unit
120 Conversion unit
500 Image processing system
510 Image supply device
530 Output device
521 Region extraction unit
522 Component calculation unit
523 Spectrum estimation unit
524 Optimization unit
525 Shadow correction unit
710 Spectrum storage unit
900 Computer device

The invention claimed is:
1. An image processing device comprising:
a memory storing computer programs; and
at least a processor configured to run the computer program to perform:
calculating a solar radiation spectrum in a certain region on a ground surface, based on an observation image of the region, a component of a solar radiation spectrum in the region, and a spectrum of a pure substance estimated in the region; and
converting the observation image, based on the calculated solar radiation spectrum, wherein the solar radiation spectrum comprises a spectrum of solar light with which the ground surface is irradiated, and wherein the spectrum of the pure substance comprises a spectrum of at least one constituent element present on the ground surface.

2. The image processing device according to claim 1, the at least a processor further configured to perform:

extracting, from the observation image, a specific region in which solar radiation is less blocked; and estimating a spectrum of the pure substance by use of the observation image of the extracted specific region, wherein the at least a processor calculates the solar radiation spectrum, based on the observation image, a component of the solar radiation spectrum, and the estimated spectrum of the pure sub stance.

3. The image processing device according to claim 1, wherein the at least a processor calculates a spectrum of the pure substance by solving an optimization problem for minimizing an error in a predetermined model.

4. The image processing device according to claim 1, wherein the at least a processor calculates a component of the solar radiation spectrum, based on a zenith angle of the sun in the region.

5. The image processing device according to claim 1, wherein the at least a processor selects at least a part of a spectrum of the pure substance depending on a location of the region.

6. The image processing device according to any claim 1, wherein the at least a processor selects at least a part of a spectrum of the pure substance, based on a classification of the region depending on a ground covering object.

7. The image processing device according to claim 1, wherein the at least a processor reads out at least a part of a spectrum of the pure substance from a storage.

8. The image processing device according to claim 1, wherein the observation image includes a plurality of pixels, and the at least a processor calculates the solar radiation spectrum for each of the plurality of pixels by use of a common value between a component of the solar radiation spectrum and a spectrum of the pure substance for the plurality of pixels.

9. An image processing method comprising:

calculating a solar radiation spectrum in a certain region on a ground surface, based on an observation image of the region, a component of a solar radiation spectrum in the region, and a spectrum of a pure substance estimated in the region; and converting the observation image, based on the calculated solar radiation spectrum, wherein the solar radiation spectrum comprises a spectrum of solar light with which the ground surface is irradiated, and wherein the spectrum of the pure substance comprises a spectrum of at least one constituent element present on the ground surface.

10. The image processing method according to claim 9, further comprising:

extracting, from the observation image, a specific region in which solar radiation is less blocked;

estimating a spectrum of the pure substance by use of the observation image of the extracted specific region; and calculating the solar radiation spectrum, based on the observation image, a component of the solar radiation spectrum, and the estimated spectrum of the pure substance.

11. The image processing method according to claim 9, further comprising calculating a spectrum of the pure substance by solving an optimization problem for minimizing an error in a predetermined model.

12. The image processing method according to claim 9, further comprising calculating a component of the solar radiation spectrum, based on a zenith angle of the sun in the region.

13. The image processing method according to claim 9, further comprising selecting at least a part of a spectrum of the pure substance depending on a location of the region.

14. The image processing method according to claim 9, further comprising selecting at least a part of a spectrum of the pure substance, based on a classification of the region depending on a ground covering object.

15. The image processing method according to claim 9, further comprising reading out at least a part of a spectrum of the pure substance from a storage.

16. The image processing method according to claim 9, wherein the region includes a plurality of pixels, and the image processing method further comprises calculating the solar radiation spectrum for each of the plurality of pixels by use of a common value between a component of the solar radiation spectrum and a spectrum of the pure substance for the plurality of pixels.

17. A non-transitory recording medium recording a program causing a computer to execute:

processing of calculating a solar radiation spectrum in a certain region on a ground surface, based on an observation image of the region, a component of a solar radiation spectrum in the region, and a spectrum of a pure substance estimated in the region; and processing of converting the observation image, based on the calculated solar radiation spectrum, wherein the solar radiation spectrum comprises a spectrum of solar light with which the ground surface is irradiated, and wherein the spectrum of the pure substance comprises a spectrum of at least one constituent element present on the ground surface.

18. The non-transitory recording medium according to claim 17, the program further causing the computer to execute:

processing of extracting, from the observation image, a specific region in which solar radiation is less blocked; and processing of estimating a spectrum of the pure substance by use of the observation image of the extracted specific region, wherein, in the processing of calculating, the computer is caused to calculate the solar radiation spectrum, based on the observation image, a component of the solar radiation spectrum, and the estimated spectrum of the pure substance.

19. The non-transitory recording medium according to claim 17, the program further causing the computer to, in the processing of calculating, calculate a spectrum of the pure substance by solving an optimization problem for minimizing an error in a predetermined model.

20. The non-transitory recording medium according to claim 17, the program further causing the computer to,
in the processing of calculating, calculate a component of the solar radiation spectrum, based on a zenith angle of the sun in the region.

\* \* \* \* \*